(12) United States Patent
Wu et al.

(10) Patent No.: US 11,070,728 B2
(45) Date of Patent: Jul. 20, 2021

(54) METHODS AND SYSTEMS OF MULTI-CAMERA WITH MULTI-MODE MONITORING

(71) Applicant: ZHEJIANG DAHUA TECHNOLOGY CO., LTD., Zhejiang (CN)

(72) Inventors: Huimin Wu, Hangzhou (CN); Haibin Huang, Hangzhou (CN); Kunpeng Liu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/455,697

(22) Filed: Jun. 27, 2019

(65) Prior Publication Data

US 2019/0320117 A1    Oct. 17, 2019

Related U.S. Application Data

(63) Continuation of application No. PCT/CN2016/112431, filed on Dec. 27, 2016.

(51) Int. Cl.
*H04N 7/18* (2006.01)
*H04N 5/232* (2006.01)
*G06T 7/70* (2017.01)

(52) U.S. Cl.
CPC .......... *H04N 5/23245* (2013.01); *G06T 7/70* (2017.01); *H04N 7/181* (2013.01); *G06T 2207/30232* (2013.01)

(58) Field of Classification Search
CPC ...... H04N 5/23245; H04N 7/181; H04N 7/18; G06T 7/70; G06T 2207/30232; G08B 13/19667; G08B 13/19643
See application file for complete search history.

(56) References Cited

U.S. PATENT DOCUMENTS

| | | | |
|---|---|---|---|
| 8,502,868 B2 | 8/2013 | Buehler et al. | |
| 2003/0095042 A1 | 5/2003 | Ebata et al. | |
| 2005/0162268 A1 | 7/2005 | Grindstaff et al. | |

(Continued)

FOREIGN PATENT DOCUMENTS

| | | |
|---|---|---|
| CN | 101252687 A | 8/2008 |
| CN | 101572804 B | 3/2012 |

(Continued)

OTHER PUBLICATIONS

The Extended European Search Report in European Application No. 16925519.7 dated Oct. 23, 2019, 9 pages.

(Continued)

*Primary Examiner* — Richard T Torrente
(74) *Attorney, Agent, or Firm* — Metis IP LLC

(57) ABSTRACT

The present disclosure relates to systems and methods of multi-camera. The method may include determining a level of a camera in a multi-camera system based on the status of an object, and determining a mode of the camera based on the level. The mode may relate to one of a bit rate, an I frame interval, or a coding algorithm. The method may further include generating a monitor file relating to the object based on the level of the camera in the multi-camera system.

5 Claims, 8 Drawing Sheets

(56) References Cited

U.S. PATENT DOCUMENTS

| | | | | |
|---|---|---|---|---|
| 2010/0283857 | A1* | 11/2010 | Gopinath | G08B 13/19669 |
| | | | | 348/152 |
| 2016/0050396 | A1* | 2/2016 | Gali | H04N 7/181 |
| | | | | 348/159 |
| 2016/0080746 | A1 | 3/2016 | Jun et al. | |
| 2016/0189500 | A1 | 6/2016 | Kim et al. | |
| 2018/0343442 | A1* | 11/2018 | Yoshikawa | H04N 21/2143 |

FOREIGN PATENT DOCUMENTS

| | | | |
|---|---|---|---|
| CN | 104079885 | A | 10/2014 |
| CN | 106162105 | A | 11/2016 |
| EP | 2934004 | A1 | 10/2015 |

OTHER PUBLICATIONS

International Search Report in PCT/CN2016/112431 dated Jun. 26, 2017, 4 Pages.
Written Opinion in PCT/CN2016/112431 dated Jun. 26, 2017, 4 Pages.

* cited by examiner

METHODS AND SYSTEMS OF MULTI-CAMERA WITH MULTI-MODE MONITORING

CROSS-REFERENCE TO RELATED APPLICATIONS

This application is a Continuation of International Application No. PCT/CN2016/112431, filed on Dec. 27, 2016, the contents of which are incorporated herein by reference in its entirety.

TECHNICAL FIELD

This present disclosure generally relates to multi-camera, and more particularly, relates to rate control and storage.

BACKGROUND

The current heightened sense of security and declining cost of camera equipment have increased the use of video surveillance systems. Such systems have the potential to reduce crime, prevent accidents, and generally increase security in a wide variety of environments. As the number of cameras in a surveillance system increases, the amount of information to be processed and analyzed increases. On the other hand, displaying and storing more and more video data becomes difficult.

SUMMARY

The present disclosure provided herein relates to methods and systems of multi-camera. According to one aspect of the present disclosure, a method of multi-camera is provided. The method may include one or more of the following operations: identifying an object in a monitored scope of a multi-camera system, the multi-camera system including a plurality of cameras; determining a status of the object; determining a level of a camera of the plurality of cameras based on the status of the object; and determining a mode of the camera of the plurality of cameras based on the level, the mode relating to one of a bit rate, an I frame interval, or a coding algorithm.

According to another aspect of the present disclosure, a method of multi-camera is provided. The method may include one or more of the following operations: identifying an object in a monitored scope of a multi-camera system, the multi-camera system including a plurality of cameras; determining a first current camera of the plurality of cameras; acquiring a first image data relating to the object from the first current camera; generating a file based on the first image data, the file relating to the object; determining a second current camera of the plurality of cameras; acquiring a second image data relating to the object from the second current camera; and updating the file based on the second image data.

According to another aspect of the present disclosure, a system of multi-camera is provided. The system may include an object module configured to identify an object in in a monitored scope of a multi-camera system. The multi-camera system including a plurality of cameras. The system may further include a level module configured to determine a status of the object. The level module may be further configured to determine a level of a camera of the plurality of cameras based on the status of the object. The system may further include a mode module configured to determine a mode of the camera of the plurality of cameras based on the level. The mode relates to one of a bit rate, an I frame interval, or a coding algorithm.

According to another aspect of the present disclosure, a system of multi-camera is provided. The system may include an object module configured to identify an object in in a monitored scope of a multi-camera system. The multi-camera system including a plurality of cameras. The system may further include a level module configured to determine first current camera and a second current camera of the plurality of cameras. The system may further include configured to acquire a first image data relating to the object from the first current camera and a second image data relating to the object from the second current camera. The monitor module may be further configured to generate a file based on the first image data, and update the file based on the second image data. The file relates to the object.

According to another aspect of the present disclosure, a non-transitory computer readable medium embodying a computer program product is provided. The computer program product comprising instructions that are configured to cause a computing device to determine a level of a camera in a multi-camera system. The computer program product includes instructions further configured to determine a mode of the camera based on the level of the camera.

According to another aspect of the present disclosure, a non-transitory computer readable medium embodying a computer program product is provided. The computer program product comprising instructions that are configured to determine a first current camera and a second current camera in a multi-camera system. The computer program product includes instructions further configured to acquire a first image data from the first current camera and acquire a second image data from the second current camera. The computer program product also includes instructions configured to generate a file based on the first image data and update the file based on the second image data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "module" and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
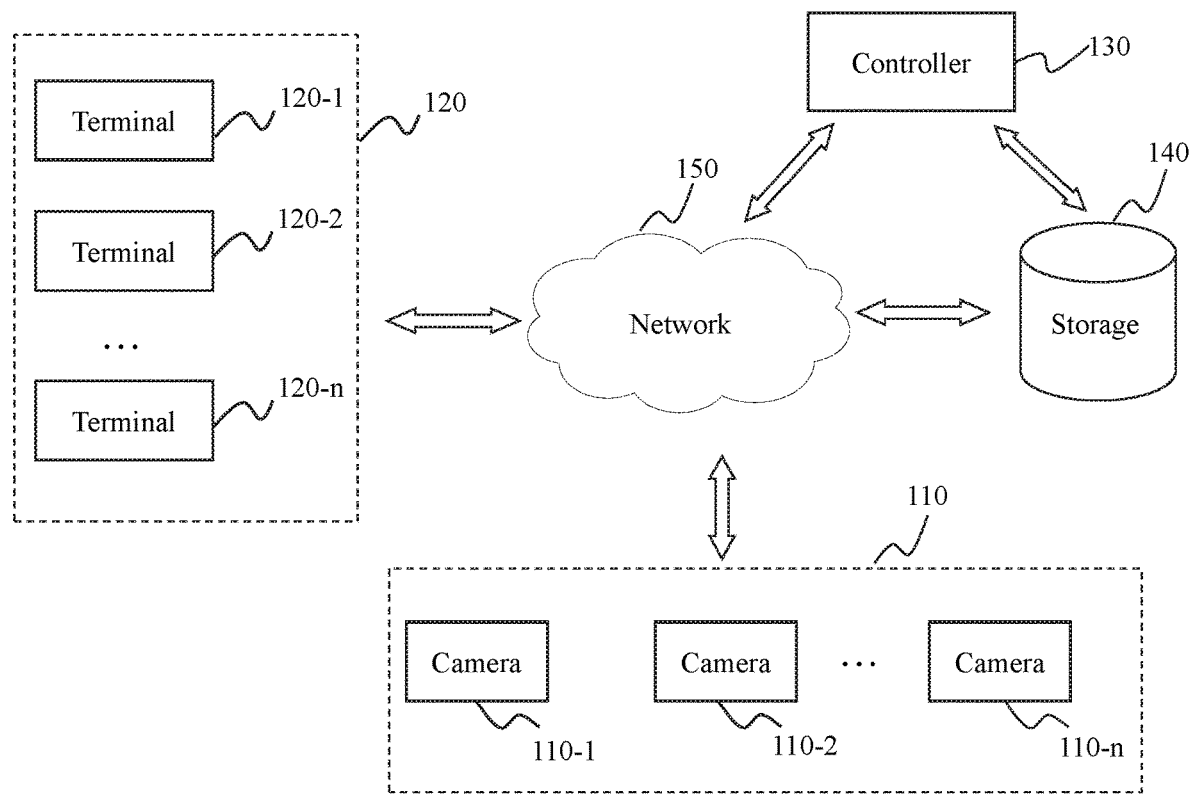
FIG. 1 is a block diagram of an exemplary multi-camera system according to some embodiments of the present disclosure.

FIG. 1 is a block diagram of an exemplary multi-camera system according to some embodiments of the present disclosure. Multi-camera system 100 may be used in various fields including, for example, security technologies, transportation management, prison system, or the like, or any combination thereof. Multi-camera system 100 may include one or more cameras 110 (e.g., 110-1, 110-2, . . . , 110-n), one or more terminals 120 (e.g., 120-1, 120-2, . . . , 120-n), a controller 130, a storage 140, and a network 150.

Camera 110 may be configured to generate image data. In some embodiments, camera 110 may include a monocular camera or a binocular camera. In some embodiments, camera 110 may include a visible light camera or a thermal imaging camera. In some embodiments, camera 110 may include an identifier. The identifier may be a name or a number associated with a particular camera 110. In some embodiments, each of camera(s) 110 may have a unique identifier. For example, the identifier may correspond to a current camera and controller 130 may assign a camera with the camera identifier as a current camera. In some embodiments, camera 110 may correspond to a field of view (FOV). The image data may relate to the FOV. In some embodiments, the image data may be color image data or gray image data. In some embodiments, the image data may be visible image data or thermal infrared image data. In some embodiments, the image data may be a video, a log file, or a combination thereof. The log file used herein may be a file recording the time point at which an object enters into and/or leaves the FOV of a camera. For the purposes of the brevity, that an object enters into or leaves the FOV of camera 110 may be illustrated as the object enters into or leaves camera 110 in the present disclosure. In some embodiments, the log file may be a text, a PDF, a code, or the like, or a combination thereof. The object may be an object in which a user may be interested. In some embodiments, the object may be an animal, a person, a machine, or a combination thereof. Camera 110 may generate raw data and generate image data by processing the raw data. In some embodiments, processing the raw data may include compressing the raw data by compression coding using a compression mode. In some embodiments, the compression mode may be based on a bit rate, an I frame interval, a coding algorithm, a frame rate, or the like, or a combination thereof. The coding algorithm may include Region of Interest (ROI) coding or Variable Bit Rate (VBR) coding. In some embodiments, the compression mode may be preset. In some embodiments, the compression mode may be adjusted dynamically. In some embodiments, the compression mode may be set and/or adjusted through controller 130.

Terminal 120 may be configured to determine an object and/or a region. The object may be an object to be monitored. In some embodiments, the object may be an animal, a person, a machine, or a combination thereof. The region used herein may be a portion of an image (e.g., an image from a video). The region may be a disappearing region, an object region, or an object activity region. The disappearing region may be a marginal region in the FOV of camera 110. One or more disappearing regions may correspond to a camera 110. In some embodiments, the disappearing region of a camera 110 may be a region close to the FOV of the another camera 100. In some embodiments, the disappearing region may be determined through a user instruction. The user instruction may include a user operation including, for example, selecting a portion of an image as a disappearing region. The object region may be a region in which at least part of the object appears. In some embodiments, the object region may be a square, rectangle, or irregular polygon. The object activity region may be a region in which the object engages an activity (e.g., moving, sitting, walking, dancing, eating, watching, etc.). The object activity region may be a region in the FOV of camera 110. In some embodiments, the object activity region may be determined based on the spatial information relating to the FOV of camera 110, behavior of the object, etc. For example, a region in which a table appears may not be determined as an object activity region. As another example, a region in which a sofa appears may be an object activity region due to the object often watches TV on the sofa.

In some embodiments, terminal 120 may receive data from the user through, for example, terminal 120, camera 110, storage 140, or other devices, or a combination thereof. The data may be the image data acquired by camera 110, information relating to camera 110 (e.g., the identifier(s) associated with camera 110), a user instruction, or a combination thereof. In some embodiments, terminal 120 may generate and transmit data to controller 130. The data may be object data, region data, or a combination thereof. The object data may be the data relating an object, for example, image data relating to the object (e.g., an image in which an object appears), the identifier associated with the object, etc. The region data may be the data relating a disappearing region, an object region, or an object activity region. In some embodiments, the region data may be coordinate information relating to the region and size information relating to the region. In some embodiments, terminal 120 may display and/or store data.

In some embodiments, terminal 120 may be a smart watch, a computer, a laptop, a Personal Digital Assistant (PDA), a mobile phone, a tablet computer, a portable device, a car, or the like, or any combination thereof. In some embodiments, terminal 120 may include an I/O, a controller, a processor, etc. (not shown). The I/O may be configured to receive input from the user, such as a keyboard input, a mouse input, a touch screen input, a handwritten input, an image input, a voice input, an electromagnetic wave input, or the like, or any combination thereof. The controller may be configured to control other components of multi-camera system 100 (e.g., camera 110, controller 130, and/or storage 140). In some embodiments, controller 130 and terminal 120 may be integrated as one device.

Controller 130 may be configured to control camera 110. In some embodiments, controller 130 may control a mode, a working status of camera 110, etc. In some embodiments, the camera mode may include a compression mode for processing raw data generated by camera 110. The compression mode may be based on a bit rate, an I frame interval, a coding algorithm, a frame rate, or the like, or a combination thereof. The coding algorithm may include ROI coding or VBR coding. In some embodiments, the working status may indicate whether camera 110 is working, for example, "on" and "off."

In some embodiments, controller 130 may receive data from camera 110, terminal 120, storage 140, or other devices. The data may be image data, object data, region data, etc. In some embodiments, controller 130 may determine a status of an object. The status of an object may be a position of the object (e.g., the position of the object in the FOV of camera(s) 110 and/or the monitored scope of multi-camera system 110). In some embodiments, the status may be determined based on feature matching. The feature may be object features extracted based on the data. In some embodiments, controller 130 may assign a camera level to camera 110. In some embodiments, the camera level may be assigned based on a status of the object. In some embodiments, controller 130 may generate a command instruction. The command instruction may relate to a mode, a working status of camera 110, or a combination thereof. In some embodiments, controller 130 may transmit a command instruction to camera 110. Camera 110 may operate according to the command instruction. For example, camera 110 may start or stop working. As another example, camera 110 may process raw data based on the mode relating to the command instruction. In some embodiments, controller 130 may generate a monitoring file based on image data. The monitoring file may include a file relating to the object being monitored. In some embodiments, the monitoring file may include a video and/or a log file.

In some embodiments, controller 130 may include one or more processors for performing the functions of controller 130 disclosed in this application, including feature matching, assigning camera levels, determining camera mode, generating monitoring file, etc. Merely by way of example, controller 130 may be a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The storage 140 may store data for the components of multi-camera system 100. In some embodiments, storage 140 may include a memory and/or a storage device. The memory may include a Random Access Memory (RAM), a Read Only Memory (ROM), a Complementary Metal Oxide Semiconductor Memory (CMOS), a magnetic surface memory, or the like, or a combination thereof. The storage device may include a Hard Disk Drive (HDD), a magnetic tape, a disc (CD-ROM, DVD-ROM, etc.), a USB Flash Drive (UFD), or the like, or any combination thereof.

In some embodiments, the data stored in storage 140 may include raw data, image data, object features, tracking graphs, region data, object data, a monitoring file, a command instruction, a user instruction, a mode (e.g., a compression mode), etc. For example, storage 140 may include an object data database. The object data database may include object data corresponding to different objects. The different objects may be identified through an object identifier. In some embodiments, the object identifier may be a name or a number. As another example, storage 140 may include a mode database. The mode database may include various modes. The various modes may be identified through a mode identifier. In some embodiments, the mode identifier may be a name or a number.

In some embodiments, storage 140 may be implemented on a cloud platform. The cloud platform may be a cloud computing platform or a cloud storing platform. The type of the cloud platform may include a private cloud, a public cloud, a hybrid cloud, a community cloud, a distributed cloud, an inter-cloud, a multi-cloud, or the like, or any combination thereof.

Network 150 may connect one or more components of the multi-camera system 100 with each other, or with an external device (e.g., an external storage device, an external information source, or the like, or a combination thereof), and may be configured to facilitate communications among them. Network 150 may be a single network or a combination of different networks. Merely by way of example, network 150 may be a tele communications network, a Local Area Network (LAN), a Wireless Local Area Network (WLAN), a Metropolitan Area Network (MAN), a Wide Area Network (WAN), a Bluetooth, a ZigBee, a Near Field Communication (NFC), a public network, a private network, a proprietary network, a Public Telephone Switched Network (PSTN), the Internet, a wireless network, a virtual network, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. For example, controller 130 may be configured to determine a disappearing region. However, those variations and modifications do not depart from the scope of the present disclosure.

Figure 2:
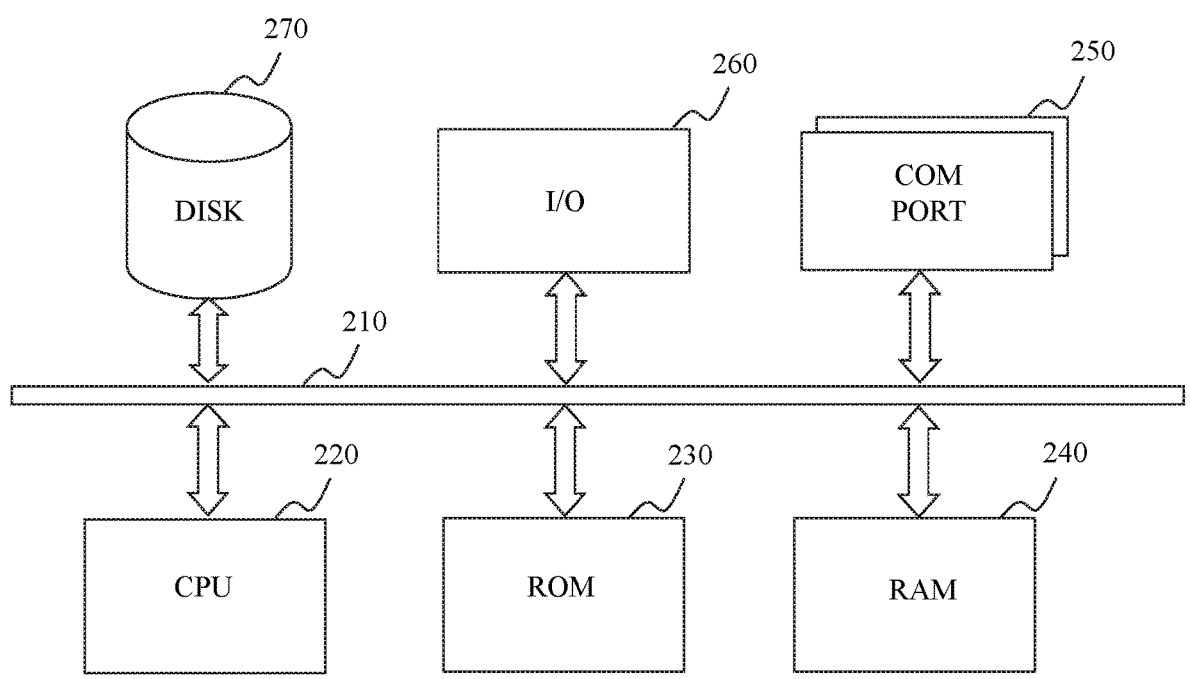
FIG. 2 is a block diagram of an exemplary computing device which can be used to realize a specialized system implementing the present disclosure.

FIG. 2 is a block diagram of an exemplary computing device which can be used to realize a specialized system implementing the present disclosure. Such a specialized system incorporating the present disclosure has a functional block diagram illustration of a hardware platform which includes user interface elements. The computer may be a general purpose computer or a special purpose computer. Both can be used to implement a specialized system for the present disclosure. This computing device 200 may be used to implement any component of multi-camera system 100 and perform one or more functions thereof as described herein. For example, controller 130 and terminal 120 may be implemented on computing device 200, via its hardware, software program, firmware, or a combination thereof. Although only one such computer is shown, for convenience, the computer functions relating to the management of the supply of service as described herein may be implemented in a distributed fashion on a number of similar platforms, to distribute the processing load.

Computing device 200 may include a central processing unit (CPU) 220, in the form of one or more processors, for executing program instructions. Computing device 200 may include an internal communication bus 210, program storage and data storage of different forms (e.g., disk 270, read only memory (ROM) 230, or random access memory (RAM) 240) for various data files to be processed and/or communicated by computing device 200, as well as possibly program instructions to be executed by CPU 220 for performing the functions of the components of multi-camera system 100. Computing device 200 may also include an I/O 260, supporting input/output flows between the computing device 200 and other components therein such as user interface elements 280. Computing device 200 may include COM port 250 connected to a network (e.g., network 150) to facilitate data communications. Computing device 200 may also receive programming and data via network communications.

Figure 3:
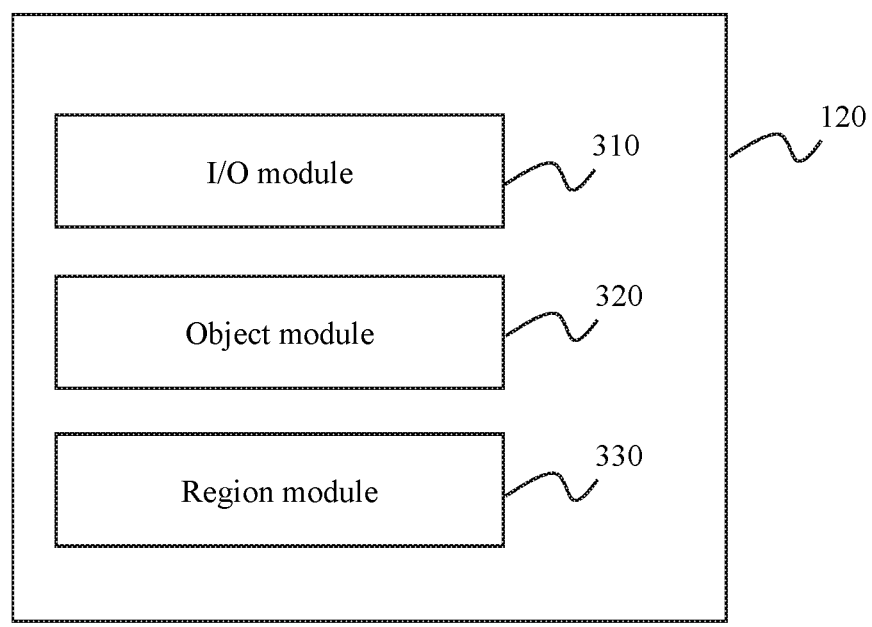
FIG. 3 is a block diagram of an exemplary terminal according to some embodiments of the present disclosure.

FIG. 3 is a block diagram of an exemplary terminal according to some embodiments of the present disclosure. Terminal 120 may include an I/O module 310, an object module 320, and a region module 330.

I/O module 310 may input/output data. In some embodiments, I/O module 310 may receive data from camera 110, controller 130, storage 140, or other devices. In some embodiments, I/O module 310 may transmit data to controller 130, storage 140, or other devices. In some embodiments, I/O module 310 may receive image data and a user instruction. In some embodiments, the user instruction may relate to an object to be monitored, determining a disappearing region, a camera working status, or a combination thereof. In some embodiments, the user instruction may be a text, or an image, or a code, or a user operation. The operation may be selecting a region and/or an object in an image. The region may be an object region, an object activity region, or a disappearing region. In some embodiments, I/O module 310 may output object data, region data, or a camera identifier. The object data may be the data relating an object, for example, image data relating to the object (e.g., an image in which an object appears), the identifier associated with the object, etc. The region data may be the data relating a disappearing region, an object region, or an object activity region. In some embodiments, the region data may be coordinate information relating to the region and size information relating to the region. In some embodiments, I/O module 310 may transmit a camera identifier to controller 130, and controller 130 may acquire image data generated by camera 110 corresponding to the camera identifier.

Object module 320 may determine an object to be monitored. In some embodiments, object module 320 may determine an object through a user input. The user input may include an operation. In some embodiments, the operation may include selecting a portion of the image generated by camera 110 and the selected portion of image data may contain at least part of the object. Alternatively or additionally, the operation may include selecting an object region in the image. Object module 320 may generate object region data including, for example, the object region coordinate information, a width of the object region, a height of the object region, or a combination thereof. In some embodiments, the operation may include selecting an object identifier. Object module 320 may acquire object data based on the object identifier. In some embodiments, the object data may be obtained from storage 140 by object module 320. In some embodiments, object module 320 may determine an object through object history data. The object history data may include object data relating to the last object being monitored. In some embodiments, object module 320 may determine an object through system default settings. The system default settings may indicate that the first object monitored by multi-camera system 100 may be the object to be monitored. In some embodiments, object module 320 may transmit the object region data, object data, object history data, or the system default settings to controller 130.

The region module 330 may determine a region. The region may be a disappearing region and/or an object activity region. The disappearing region may be a marginal region in a FOV of a camera. The object activity region may be a region in which the object may engages an activity. The activity may be moving, sitting, walking, dancing, eating, watching, or the like, or a combination thereof. The object activity region may be a region in the FOV of camera 110. The region may be determined manually or automatically. For example, the object activity region may be determined manually through a user operation. In some embodiments, the operation may include selecting a portion of the image. As another example, the region may be determined automatically through machine learning. In some embodiments, the machine learning may be performed based on the spatial information relating to the FOV of camera 110, behavior of the object, etc. For example, a region in which a table appears may not be an object activity region. As another example, a region in which a sofa appears may be an object activity region due to the object often watches TV on the sofa. In some embodiments, the region module 330 may generate region data including, for example, the region coordinate information, a width of the region, a height of the region, or a combination thereof. In some embodiments, the region module 330 may transmit the region data to controller 130.

It should be noted that the above description is merely provided for the purposes of illustration, and not intended to limit the scope of the present disclosure. For persons having ordinary skills in the art, multiple variations and modifications may be made under the teachings of the present disclosure. For example, terminal 120 may further include a storage module configured to store data, for example, object data. As another example, object module 320 may transmit the object identifier to controller 130, and controller 130 may acquire object information from storage 140 based on the object identifier. However, those variations and modifications do not depart from the scope of the present disclosure.

Figure 4:
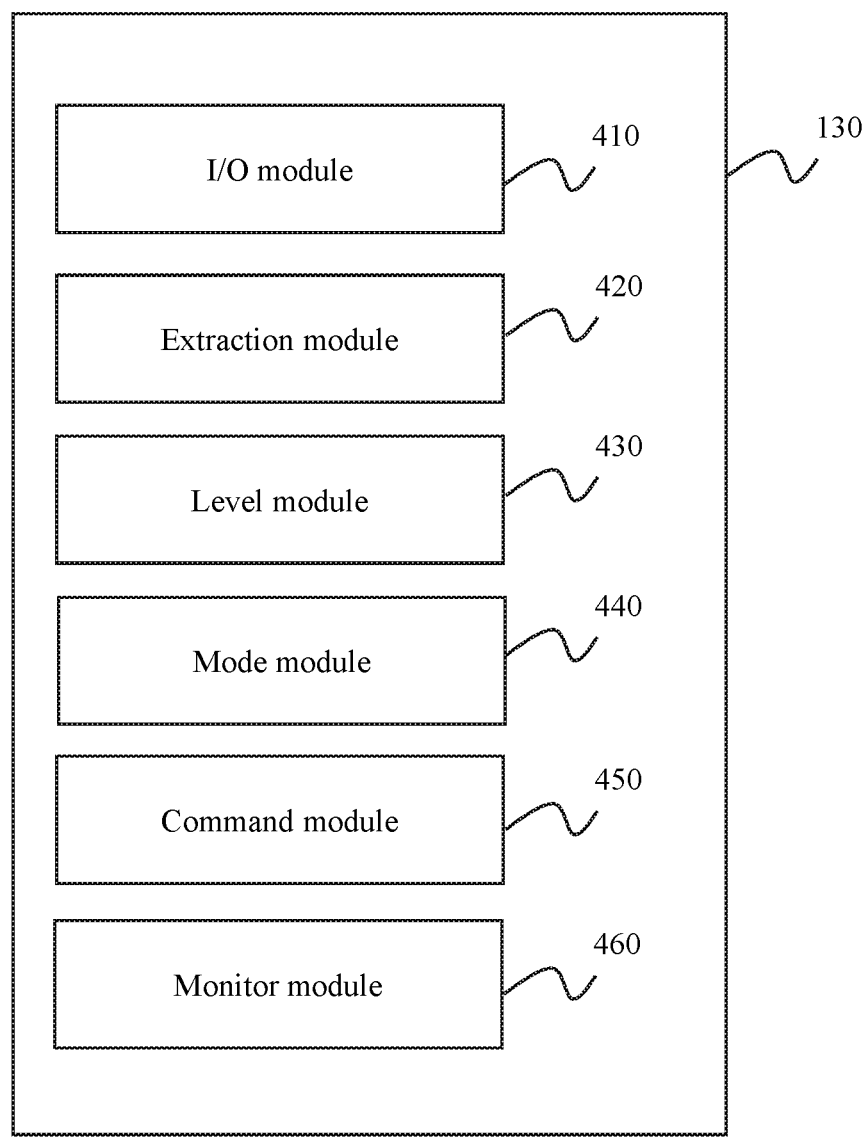
FIG. 4 is a block diagram of an exemplary controller according to some embodiments of the present disclosure.

FIG. 4 is a block diagram of an exemplary controller according to some embodiments of the present disclosure. Controller 130 may include an I/O module 410, an extraction module 420, a level module 430, a mode module 440, a command module 450 and a monitor module 460.

I/O module 410 may input/output data. The data may be image data, object data, region data, a command instruction, object history data, system default settings, a camera identifier, or a combination thereof. The object data may be the data relating an object, for example, image data relating to the object (e.g., an image in which an object appears), the identifier associated with the object, etc. The region data may be the data relating a disappearing region, an object region, or an object activity region. In some embodiments, the region data may be coordinate information relating to the region and size information relating to the region. In some embodiments, I/O module 410 may receive data from camera 110, the terminal 120, storage 140, or other devices. In some embodiments, I/O module 410 may transmit data to camera 110, storage 140, or other devices.

Extraction module 420 may extract a feature of an object. The feature of an object may include color, texture, edge feature, shape feature, and/or movement tendency of the object, and spatial relationship between the object to camera(s) 110, or a combination thereof. Extraction module 420 may extract the feature based on object data. The object data may be the image data relating to the object. In some embodiments, the object data may include the image captured by the current camera. In some embodiments, the object data may be acquired from camera 110 based on object region. In some embodiments, the object data may be acquired from storage 140 based on the object identifier associated with the object. In some embodiments, the object data may be acquired from camera 110 based on the camera identifier associated with camera 110. In some embodiments, the object data may be object history data. In some embodiments, the object data may be system default settings. The extraction 420 may extract features based on linear transformation method, two-dimensional feature detection algorithm, or locality preserving feature detection algorithm, or a combination thereof.

Level module 430 may assign a camera level to camera 110. The camera level may include two levels, three levels, four levels, etc. For the purposes of illustration, level module 430 may set three camera levels: a first level (a high level), a second level (a middle level), and a third level (a low level). In some embodiments, level module 430 may assign the camera level based on a status of an object. The status of an object may be a position of the object (e.g., the position of the object in the FOV of camera(s) 110 and/or the monitored scope of multi-camera system 110). For example, a current camera may be assigned to the first level. The current camera used herein may be camera 110 corresponding to the FOV in which the object appears. In some embodiments, the current camera may include more than one camera. As another example, a neighbouring camera may be assigned to the second level. The neighbouring camera used herein may be camera 110 whose FOV is likely to be entered by the object from the FOV of the current camera. In some embodiments, the neighboring camera may include more than one camera 100. As still another example, the non-neighboring camera may be assigned to the third level. The non-neighboring camera used herein may be camera(s) other than the current camera and the neighboring camera in multi-camera system 100. In some embodiments, the neighboring camera may include more than one camera 110.

In some embodiments, level module 430 may determine the status of an object. In some embodiments, the status of the object may be determined based on a user instruction, object features, disappearing region, a tracking graph, or a combination thereof. The user instruction received from the user through, for example, terminal 120 may indicate the status of the object. For example, the user instruction may be a camera identifier corresponding to the current camera. As another example, the user instruction may be a user operation including selecting an object region that may be one portion of an image generated by a camera 110 in which the object appears, and camera 110 may be set as a current camera.

In some embodiments, the object features may be used for feature matching. The feature may include color, texture, edge features, shape features, movement tendency of the object, and spatial relationship between the object to camera(s) 110, or a combination thereof. For example, level module 430 may match the object features with the image data acquired by camera 110. If level module 430 determines the object in the image data matches with a known object, level module 430 may determine the object appears in the FOV of camera 110.

Alternatively or additionally, level module 430 may determine the status of the object based on the disappearing region, which may be a marginal region in the FOV of a camera 110. For example, level model 430 may determine whether the object appears in the disappearing region of a camera 110 by analyzing the image captured by camera(s) 110. If so, level model 430 may determine the camera 110 as a current camera. Level model 430 may further determine another camera 110 as a neighboring camera according to the physical location relationship between the current camera and the another camera 110 (or the FOVs thereof).

Alternatively or additionally, level module 430 may determine the status of the object based on a tracking graph, which in some embodiments may be a topology graph relating to cameras 110. The tracking graph may represent a physical location relationship between different cameras 110. In some embodiments, the tracking graph may indicate a physical location relationship of FOVs between different cameras 110. As an example, level module 430 may determine the current status of an object based on feature matching. Level module 430 may predict a future status of the object based on the current status, the disappearing region, and/or the tracking graph.

Mode module 440 may determine a mode of camera 110. The camera mode may include a compression mode for processing raw data generated by camera 110. In some embodiments, the compression mode may relate to a bit rate, an I frame interval, a coding algorithm, a frame rate, or a combination thereof. The coding algorithm may include Region of Interest (ROI) coding or Variable Bit Rate (VBR) coding. In some embodiments, the mode may be preset or adjusted dynamically. For example, the mode may be preset or adjusted dynamically based on a user instruction received from the user through, for example, terminal 120. The user instruction may include a user operation including selecting a mode among various modes. Mode module 440 may control camera 110 to operate under a mode based on the instruction received. For the purposes of illustration, mode module 440 may set one of three modes of camera 110: a first mode (or high mode), a second mode (or middle mode), and a third mode (or low mode). In some embodiments, the first, second, and third modes of camera 110 may specify various parameters under which camera 110 captures the raw data. Alternatively or additionally, a mode of camera 110 may specify the parameters for compressing the raw data captured by camera. The compression may be performed by camera 110, terminal 120, and/or controller 130.

In some embodiments, the parameters specified in a mode of camera may include a bit rate, I frame interval, frame rate, ROI coding, etc. In some embodiments, The ROI coding may be performed on raw data corresponding to an object activity region. In some embodiments, the first mode may specify a first bit rate, a first I frame interval, a first frame rate, and/or ROI coding, etc. Merely by way of example, the first bit rate may be 4 Mbps, the first I frame interval may be 50, and the first frame rate may be 25 FPS.

In some embodiments, the second mode may specify a second bit rate, a second I frame interval, a second frame rate, etc. In some embodiments, the second bit rate may be lower than the first bit rate. For example, the first bit rate may be set as 4 Mbps, while the second bit rate may be 2 Mbps (i.e., half of the first bit rate). In some embodiments, the second I frame interval may be greater than the first I frame interval. For example, the first I frame interval may be set as 50, while the second I frame interval may be 100 (i.e., double of the first I frame interval). In some embodiments, the second frame rate may be same as the first frame rate. For example, the first frame rate may be set as 25 FPS, while the second frame rate may be 25 FPS.

In some embodiments, the third mode may specify a third bit rate, a third I frame interval, a third frame rate, VBR coding, etc. In some embodiments, the third bit rate may be lower than the second bit rate. For example, the second bit rate may be set as 2 Mbs, while the third bit rate may be 1 Mbps (i.e., half of the second bit rate). The third bit rate used herein may be the maximum bit rate in the third mode due to the bit rate used in VBR coding may be variable. In some embodiments, the third I frame interval may be greater than the second I frame interval. For example, the second I frame interval may be set as 100, while the third I frame interval may be 200 (i.e., double of the second I frame interval). In some embodiments, the third frame rate may be lower than the first frame rate and/or the second frame rate. For example, the first frame rate and/or the second frame rate may be set as 25 FPS, while the third frame rate may be 12.5 FPS (i.e., half of the first frame rate).

In some embodiments, mode module 440 may determine the mode of a camera 110 based on the level of the camera 110. Merely by way of example, the high camera mode, the middle camera mode, and the low camera mode may correspond to a high level of camera 110 (e.g., the status of camera 110 being a current camera), a middle level of camera 110 (e.g., the status of camera 110 being a neighbouring camera), and a low level (i.e., the status of camera 110 being a non-neighbouring camera), respectively. And mode module 440 may determine the camera mode of a camera 110 as the high mode if the camera 110 is a current camera (or as the low mode if the camera 110 is a non-neighbouring camera).

In some embodiments, the correlation between camera modes and camera levels may be preset or adjusted dynamically. For example, the correlation may be preset or adjusted dynamically based on a user instruction received from the user. As another example, the correlation may be adjusted dynamically based on the time of capturing the image, brightness, activities of the object, etc. In a more particular example, if mode module 440 determines the time of capturing the image is at night, the correlation may be adjusted as the all levels (e.g., the first level, the second level, and the third level) correspond to the third mode. As another more particular example, if mode module 440 determines that the brightness in the FOV of camera 110 is lower, the correlation may be adjusted as the first level and the second level correspond to the first mode. As another more particular example, if mode module 440 determines the activity of the object (e.g., a baby, an old man) is almost still (e.g., sleeping, watching TV, etc.), the correlation may be adjusted as the all levels (e.g., the first level, the second level, and the third level) correspond to the third mode.

Command module 450 may generate a command instruction. The command instruction may relate to a camera working status, a camera mode, or a combination thereof. In some embodiments, the command instruction may be a start/stop instruction. The start/stop instruction may start/stop camera 110. For example, in response to determining the object has entered into the monitored scope of multi-camera system 100, command module 450 may generate the start instruction for starting one or more cameras 110. The monitored scope of multi-camera system 100 may include the FOV of one or more cameras 110. As another example, if command module 450 determine the object has left the monitored scope of multi-camera system 100, command module 450 may generate the stop instruction for stopping one or more cameras 110 from capturing an image or working. In some embodiments, the start/stop instruction may be generated according to a user instruction by the user. For example, command module 450 may generate the start/stop instruction by receiving a user instruction from the user through terminal 120 for shutting down one or more cameras 110. In some embodiments, the start/stop instruction may be generated automatically. For example, command module 450 may generate the start/stop instruction by determining whether the object appears in the monitored scope of multi-camera system 100.

In some embodiments, the command instruction may be a mode instruction. The mode instruction may assign a camera mode to camera 110. In some embodiments, the mode instruction may be generated based on the determination of mode module 440 with respect to the camera mode of camera 110. For example, mode module 440 determined a mode of camera 110 as a first mode, command module 450 may generate a mode instruction indicating camera 100 is assigned to a first mode. In some embodiments, command instruction may be transmitted to camera 110 and camera 110 may operate based on the command instruction. For example, camera 110 may start/stop working, process raw data under a mode, etc. In some embodiments, command instruction may be transmitted to terminal 120 and/or controller 130. Terminal 120 and/or controller 130 may operate based on the command instruction. For example, terminal 120 and/or controller 130 may process raw data captured by camera 110 under a mode.

Monitor module 460 may generate a monitoring file. The monitoring file may include a file relating to an object being monitored. The object may be an object which a user is interested in, for example, a person, an animal, a machine, etc. In some embodiments, monitor module 460 may generate a monitoring file based on image data, a log file, or a combination thereof. The image data may be a video, a log file, or a combination thereof. The image data may be generated by camera 110 including, for example, different current cameras in a time period. The image data may be acquired from current cameras or a storage device (e.g., storage 140). For example, monitor module 460 may generate the monitoring file by compiling the image data (e.g., combining the image data or associating different images with each other). The compiling the image data may be based on the time points (or time periods) of the image data being captured by camera 110. Alternatively or additionally, The compiling the image data may be based on the time points at which the object enter into the FOV of camera 110 (e.g., the time point recorded in the log file). As another example, monitor module 460 may generate the monitoring file by writing the image data into a file. The writing the image data may be based on the time points (or time periods) of the image data being captured by camera 110. The file may be a blank file or an existing monitoring file. As still another example, monitor module 460 may generate the monitoring file by editing the image data. The editing the image data may be based on the time points at which the object enter into the FOV of camera 110 (e.g., the time point recorded in the log file). In some embodiments, generating the monitoring file by monitor module 460 and generating image data by one or more current cameras may be performed synchronously or asynchronously.

It should be noted that the above description is merely provided for the purposes of illustration, and not intended to limit the scope of the present disclosure. For persons having ordinary skills in the art, multiple variations and modifications may be made under the teachings of the present disclosure. For example, level module 430 may set two camera levels: a first level and a second level. The first level may correspond to a current camera and the second level may correspond to a non-current camera. The non-current camera may be a camera 110 other than a current camera in multi-camera system 100. As another example, controller 130 may further include a storage module (not shown) configured to store data (e.g., a monitoring file generated by monitor module 460). However, those variations and modifications do not depart from the scope of the present disclosure.

Figure 5:
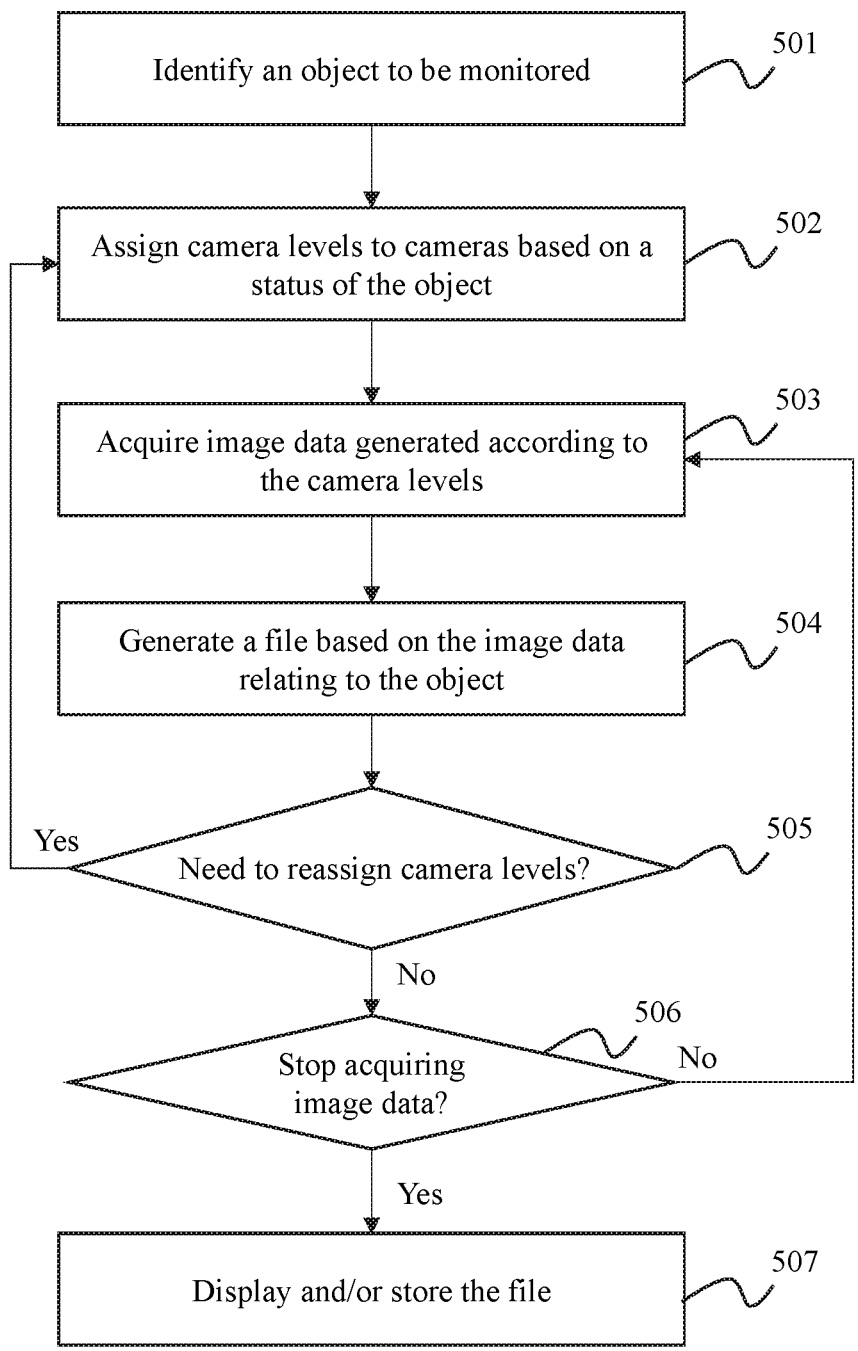
FIG. 5 is a flow chart of an exemplary process for determining a camera mode and generating a monitoring file according to some embodiments of the present disclosure.

FIG. 5 is a flow chart of an exemplary process for determining a camera mode according to some embodiments of the present disclosure. In some embodiments, process 500 may be performed by controller 130. In 501, object module 320 may identify an object to be monitored. The object may be an object which a user is interested in, for example, a person, an animal, a machine, etc. In some embodiments, object module 320 may identify the object through a user operation. The user operation may include selecting an object region in an image (e.g., an image from image data acquired by camera 110), selecting an object identifier associated with the object (e.g., a name or a number), etc. In some embodiments, object module 320 may identify the object through object history data. The object history data may include object data relating to the last object being monitored. In some embodiments, object module 320 may identify the object through system default settings. The system default settings may indicate that the first object monitored by multi-camera system 100 is the object to be monitored.

In 502, level module 430 may assign camera levels to cameras 110 based on a status of the object. The camera levels may include two levels, three levels, four levels, etc. For the purposes of illustration, level module 430 may set three camera levels: a first level, a second level, and a third level. The status of an object may be a position of the object (e.g., the position of the object in the FOV of camera(s) 110 and/or the monitored scope of multi-camera system 110). In some embodiments, level module 430 may determine the status of the object based on a user instruction, object features, a disappearing region, a tracking graph, or a combination thereof. For example, level module 430 may determine the status of the object by feature matching based on the object feature and known object feature. The features may include color, texture, edge features, shape features, movement tendency, spatial relationship, or a combination thereof. In some embodiments, level module 430 may determine the status of the object as described elsewhere in this disclosure in connection with FIG. 4. In some embodiments, level module 430 may determine camera(s) 110 as a current camera, a neighboring camera, and/or a non-neighboring camera. Level module 430 may assign the current camera to the first level, assign the neighboring camera to the second level, and/or assign the non-neighboring camera to the third level. In some embodiments, level module 430 may determine camera(s) 110 as a current camera and/or a non-current camera. Level module 430 may assign the current camera to the first level and/or assign the non-current camera to the second level.

In 503, monitor module 460 may acquire image data generated according to the camera levels. The image data may be generated according to the camera levels. In some embodiments, the camera levels may determine the mode of camera 110. The mode may include a compression mode. In some embodiments, monitor module 460 may acquire image data generated according to the mode. In some embodiments, monitor module 460 may acquire image data generated according to the camera levels as described elsewheres in this disclosure in connection with FIG. 6.

In 504, monitor module 460 may generate a file based on the image data relating to the object. The file may be a monitoring file relating to the object being monitored. In some embodiments, the file may include a log file, a video, or a combination thereof. The image data relating to the object may be a video, a log file, or a combination thereof. In some embodiments, the image data relating to the object may be generated by different current cameras in a time period. In some embodiments, the image data relating to the object may be acquired from current cameras or a storage device (e.g., storage 140). In some embodiments, monitor module 460 may generate a file by compiling the image data (e.g., combining the image data or associating different images with each other), writing the image data into a file, and/or editing the image data. In some embodiments, monitor module 460 may generate the file as described elsewhere in this disclosure in connection with FIG. 4.

In 505, level module 430 may determine whether there is a need to reassign camera levels. In some embodiments, the determination may be based on the status of the object. For example, if level module 430 determines the object enters into a neighboring camera, level module 430 may determine to reassign the camera levels (e.g., the camera levels of a current camera, a neighboring camera, etc.) and process 500 may proceed to 502. As another example, if level module 430 determines the object enters into a disappearing region, level module 430 may determine to reassign the camera levels of the camera 110 (e.g., the camera level of a neighboring camera, etc.) and process 500 may proceed to 502. As still another example, if level module 430 determines the status of the object is always in the FOV of the current camera (e.g., the object is sleeping, watching TV, etc.), process 500 may proceed to 506 and determine whether to stop acquiring or capturing image data.

In 506, monitor module 460 may determine whether to stop acquiring image data. In some embodiments, the determination may be performed based on a user instruction by the user. The user instruction may indicate stop acquiring image data. In some embodiments, the determination may be performed based on a command instruction by controller 130. The command instruction may include a stop instruction. In some embodiments, if monitor module 460 determines do not stop acquiring image data, process 500 may proceed to 503 and acquire image data generated according to the camera levels. In some embodiments, if monitor module 460 determines to stop acquiring image data, process 500 may stop acquiring image data and proceed to 507.

In 507, the file may be displayed and/or stored. The file may be displayed through a terminal (e.g., terminal 120). In some embodiments, the terminal may include a car, a computer, a cellphone, a watch, etc. The file may be stored in a storage device (e.g., storage 140). In some embodiments, the storage device may be implemented on a cloud platform.

It should be noted that the above description is merely provided for the purposes of illustration, and not intended to limit the scope of the present disclosure. For persons having ordinary skills in the art, multiple variations and modifications may be made under the teachings of the present disclosure. For example, in 504, the file may be generated after 506. However, those variations and modifications do not depart from the scope of the present disclosure.

Figure 6:
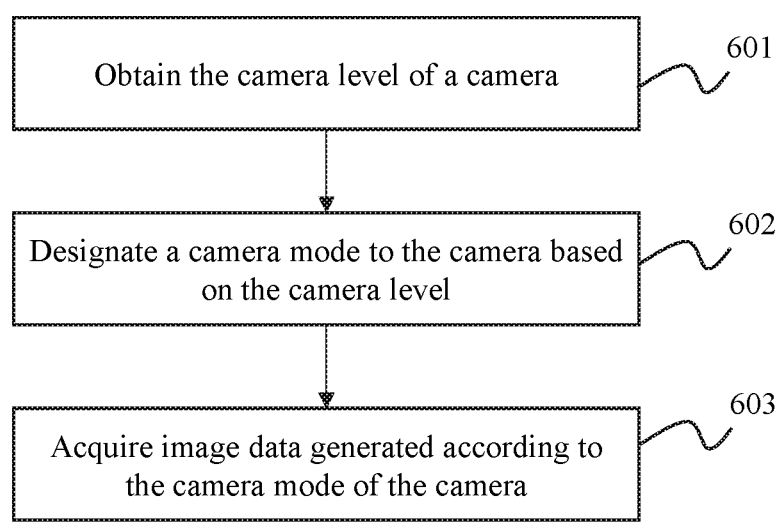
FIG. 6 is a flow chart of an exemplary process for acquiring image data according to some embodiments of the present disclosure.

FIG. 6 is a flow chart of an exemplary process for acquiring image data according to some embodiments of the present disclosure. In some embodiments, process 600 may be performed by controller 130. In 601, level module 430 may obtain the camera level of a camera 110. The camera level may include two levels, three levels, four levels, etc. In some embodiments, the camera level of the camera 110 may be determined through a status of an object. In some embodiments, the camera level may be determined as described elsewhere in this disclosure in connection with 502. In some embodiments, level module 430 may set three camera levels: a first level, a second level, and a third level. As an example, a current camera may be assigned to the first level, the neighboring camera may be assigned to the second level, and the non-neighboring camera may be assigned to the third level. In some embodiments, level module 430 may set two camera levels: a first level and a second level. As an example, a current camera may be assigned to the first level, and a non-current camera may be assigned to the second level. The non-current camera may be a camera 110 other than a current camera in multi-camera system 100.

In 602, mode module 440 may designate a camera mode to camera 110 based on the camera level. The mode may include a compression mode for processing raw data generated by camera 110. In some embodiments, the mode may relate to a bit rate, an I frame interval, a frame rate, a coding algorithm, or the like, or a combination thereof. In some embodiments, mode module 440 may designate the mode based on a correlation between the camera level and the mode. For example, mode module 440 may set three modes: a first mode, a second mode, and a third mode. The correlation may represent the first level, the second level, and the third level may correspond to the first mode, the second mode, and the third mode, respectively. As another example, mode module 440 may set two modes: a first mode and a second mode. The correlation may represent the first level and the second level may correspond to the first mode and the second mode, respectively. As an example, mode module 440 may designate the first mode to a camera in the first level.

In 603, monitor module 460 may acquire image data generated according to the camera mode of camera 110. For the purposes of illustration, mode module 440 set three modes (a first mode, a second mode, and a third mode). In some embodiments, the first, second, and third modes of camera 110 may specify various parameters under which camera 110 captures the raw data. Alternatively or additionally, a mode of camera 110 may specify the parameters for compressing the raw data captured by camera. In some embodiments, the first mode may specify a first bit rate, a first I frame interval, a first frame rate, ROI coding, etc. The ROI coding may be performed on raw data corresponding to an object activity region. Merely by way of example, the first bit rate may be set as 4 Mbps, the first I frame interval may be set as 50, and the first frame rate may be set as 25 FPS. In some embodiments, the second mode may specify a second bit rate, a second I frame interval and a second frame rate. In some embodiments, the second bit rate may be lower than the first bit rate (e.g., half of the first bit rate, for example, 2 Mbps). In some embodiments, the second I frame interval may be greater than the first I frame interval (e.g., double of the first I frame interval, for example, 100). In some embodiments, the second frame rate may be same as the first frame rate, for example, 25 FPS. In some embodiments, the third mode may specify a third bit rate, a third I frame interval, a third frame rate and VBR coding. In some embodiments, the third bit rate may be lower than the second bit rate (e.g., half of the second bit rate, for example, 1 Mbps). The third bit rate used herein may be the maximum bit rate in the third mode due to the bit rate used in VBR coding may be variable. In some embodiments, the third I frame interval may be greater than the second I frame interval (e.g., double of the second I frame interval, for example, 200). In some embodiments, the third frame rate may be lower than the first/second frame rate (e.g., half of the first/second frame rate, for example, 12.5 FPS). In some embodiments, monitor module 460 may acquire image data from a camera (e.g., camera 110). In some embodiments, monitor module 460 may acquire image data from a storage device (e.g., storage 140).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
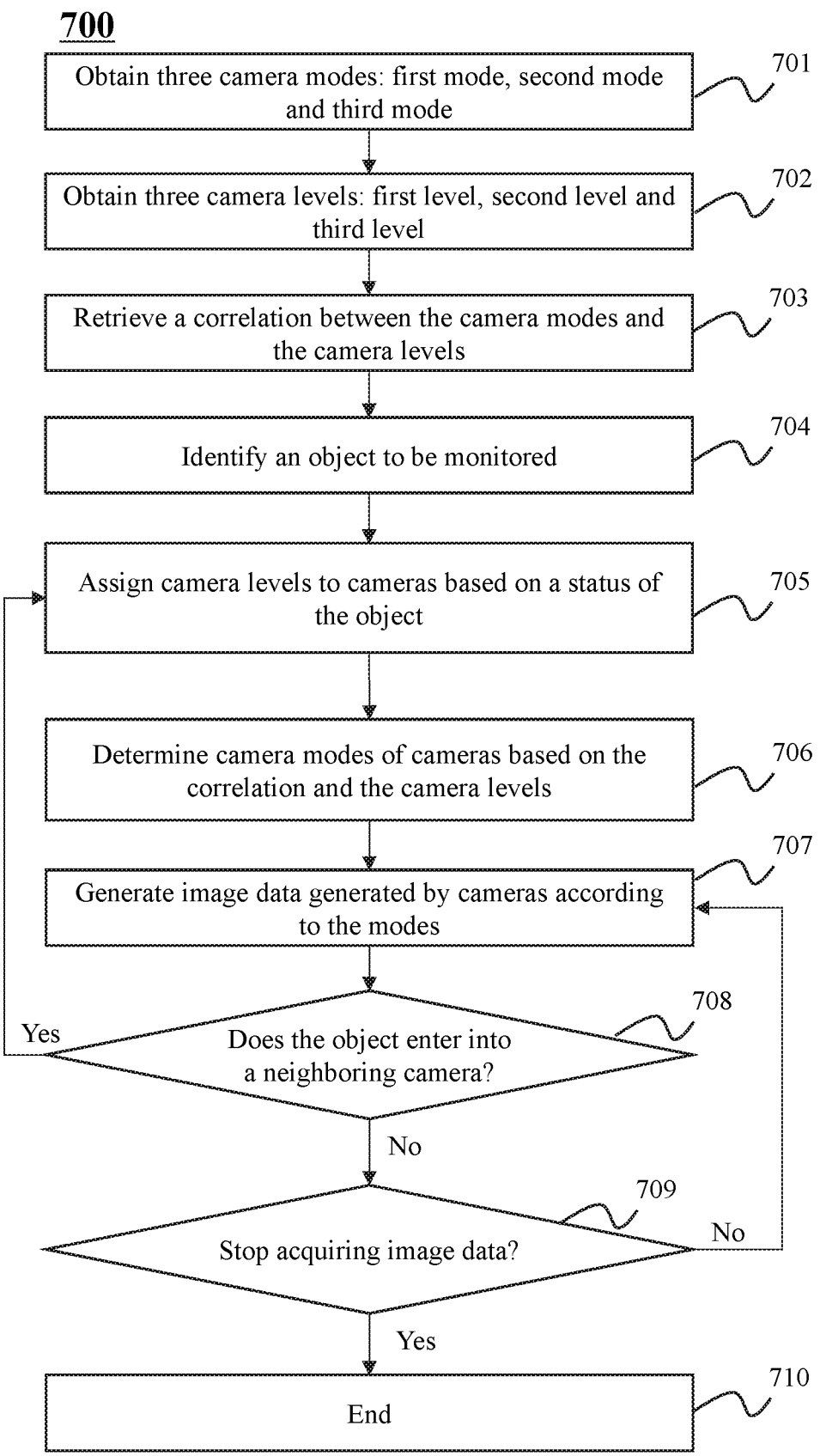
FIG. 7 is a flow chart of an exemplary process for determining a camera mode according to some embodiments of the present disclosure.

FIG. 7 is a flow chart of an exemplary process for determining a camera mode according to some embodiments of the present disclosure. In some embodiments, process 700 may be performed by controller 130. In 701, three camera modes may be obtained. The modes may include a compression mode. For the purposes of illustration, the three camera modes may be marked as a first mode, a second mode, and a third mode. In some embodiments, each camera mode may relate to a bit rate, an I frame interval, a frame rate, a coding algorithm, or the like, or a combination thereof. In some embodiments, the three camera modes may be preset or adjusted dynamically. The first mode may specify a first bite rate, a first I frame interval, a first frame rate and a first coding algorithm. In some embodiments, the first bite rate may be 4 Mbps, the first I frame interval may be 50, the first frame rate may be 25 FPS and the first coding algorithm may be ROI coding. In some embodiments, the ROI coding may be employed on raw image corresponding to an object activity region. The object activity region may be a region in which the object engage an activity (e.g., moving, sitting, walking, dancing, eating, watching, etc.). A second mode may specify a second bite rate, a second I frame interval and a second frame rate. In some embodiments, the second bit rate may be half of the first bit rate, the second I frame interval may be double of the first I frame interval and the second frame rate may be same as the first frame rate. For example, the second bit rate may be 2 Mbps, the second I frame interval may be 100 and the second frame rate may be 25 FPS. ROI coding may be absent in the second mode. A third mode may specify a third bite rate, a third I frame interval, a third frame rate and a third coding algorithm. In some embodiments, the third bit rate may be half of the second bit rate, the third I frame interval may be double of the second I frame interval, and the third frame rate may be half of the first frame rate. For example, the third bit rate may be 1 Mbps, the third I frame interval may be 200, and the third frame rate may be 12.5 FPS. In some embodiments, the third coding algorithm may be VBR coding. It should be noted that the third bit rate used herein may be variable and may be the maximum bit rate in the third mode because of VBR coding.

In 702, three camera levels are obtained. For the purposes of illustration, the three camera levels may be marked as a first level, a second level and a third level. The three camera levels may relate to a status of an object. In some embodiments, the first level may correspond to a current camera, the second level may correspond to a neighboring camera, and the third level may correspond to a non-neighboring camera. In 703, a correlation between the camera modes and the camera levels is retrieved. In some embodiments, the correlation may be established in mode module 440. In some embodiments, the correlation may be the first level, the second level, and the third level correspond to the first mode, the second mode, and the third mode, respectively.

In 704, an object to be monitored is identified. In some embodiments, the object may be an animal, a person, a machine, or a combination thereof. In some embodiments, the object may be identified based on a user operation, object history data, system default settings, or a combination thereof. In some embodiments, the object may be identified by object module 320 as described in connection with FIG. 3. In 705, camera levels may be assigned to cameras 110 based on a status of the object. In some embodiments, a current camera may be assigned to the first level. A neighboring camera may be assigned to the second level. And a non-neighboring camera may be assigned to the third level. In 706, camera modes of cameras may be determined based on the correlation and the camera levels. In some embodiments, the mode of a camera in the first level may be determined as the first mode, the mode of a camera in the second level may be determined as the second mode, and the mode of a camera in the third level may be determined as the third mode. In 707, image data may be generated by cameras according to the modes. In some embodiments, the image data may be generated by a current camera in the first mode. In some embodiments, the image data may be generated by a neighboring camera in the second mode. In some embodiments, the image data may be generated by a non-neighboring camera in the third mode. In 708, level module 430 may determine whether the object enters into a neighboring camera. The phase "enters into" used herein may be used for brevity, which means the object enters into the FOV of a camera 110 (or cameras 110). In some embodiments, if level module 430 determines the object enters into a neighboring camera, process 700 may proceed to 705. In some embodiments, if level module 430 determines the object does not enter into a neighboring camera, process 700 may proceed to 709 and determine whether to stop acquiring image data. In some embodiments, the determination may be based on a user operation or the status of the object. For example, if level module 430 determines the status of the object is out of the monitored scope of multi-camera system 100, process 700 may stop acquiring image data. In some embodiments, if monitor module 460 determines do not stop acquiring image data, process 700 may proceed to 707 and continue to acquire image data. In some embodiments, if monitor module 460 determines stop acquiring image data, process 700 may proceed to 710, where process 700 may be ended.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
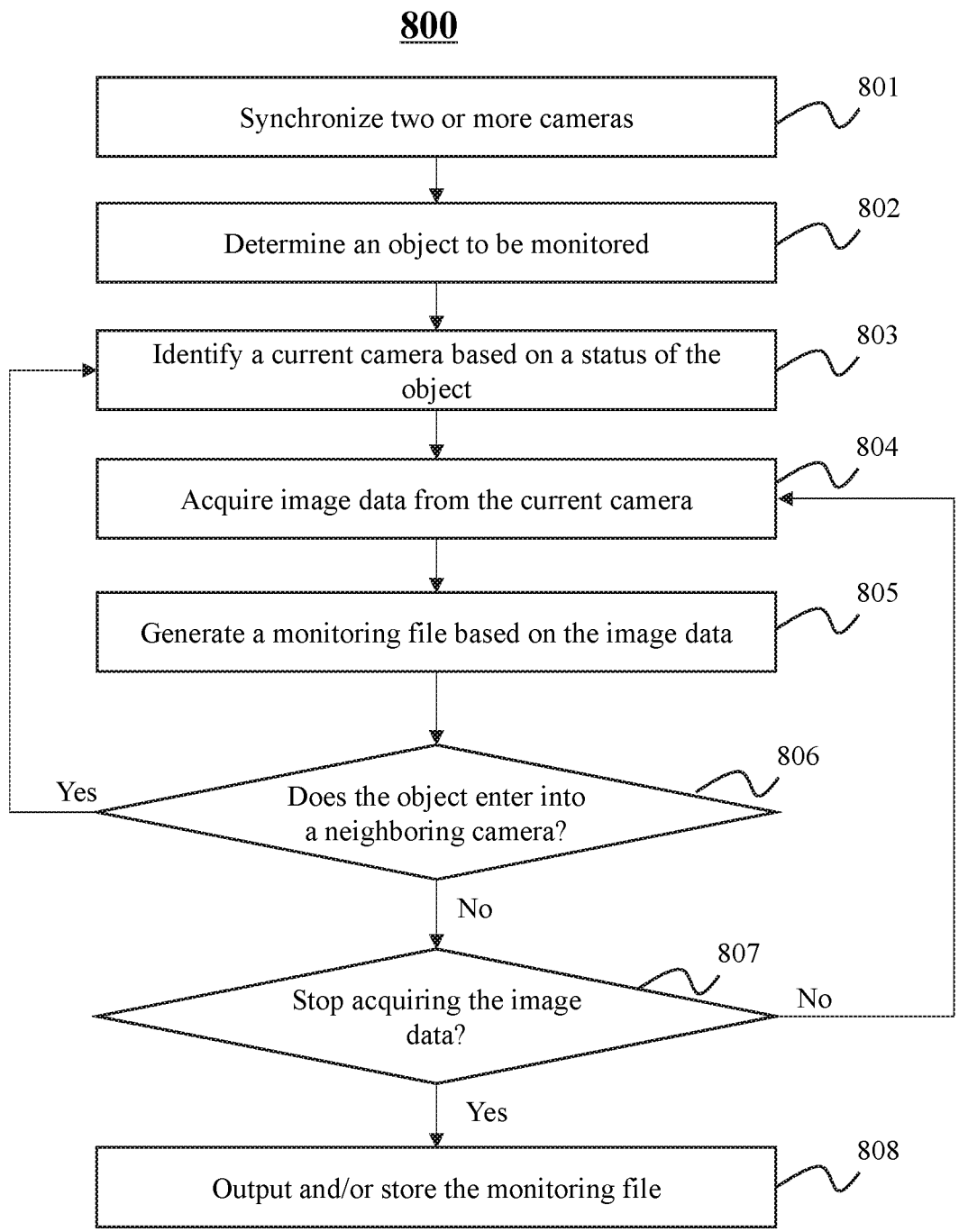
FIG. 8 is a flow chart of an exemplary process for generating a monitoring file according to some embodiments of the present disclosure.

FIG. 8 is a flow chart of an exemplary process for generating a monitoring file according to some embodiments of the present disclosure. In some embodiments, process 800 may be performed by controller 130. In 801, two or more cameras 110 may be synchronized. In some embodiments, camera(s) 110 may be adjusted with a same time parameter. In 802, an object to be monitored may be determined. In some embodiments, the object may be an animal, a person, a machine, or a combination thereof. In some embodiments, the determination may be performed based on image data generated by camera(s) 110. The image data may be video streams from camera(s) 110. In some embodiments, the object may be identified based on a user instruction, object history data, system default settings, or a combination thereof. For example, process 800 may determine the object by a user through a user instruction. The user instruction may include an object identifier. As another example, a user may select an object region from the video streams, and object module 430 may determine the object based on the object region. In some embodiments, the object may be identified by object module 320 as described elsewhere in this disclosure in connection with FIG. 3. In 803, a current camera may be identified based on a status of the object. For example, if level module 430 determines the status of the object appears in the FOV of camera 110, level module 430 may identify camera 110 corresponding to the FOV as a current camera. In 804, image data may be acquired from the current camera. In some embodiments, the image data may be acquired in real time in the process of the image data generation. In 805, a monitoring file may be generated based on the image data. The monitoring file may be a video or a log file. In some embodiments, the monitoring file may be generated in real time in the process of the image data acquisition. In some embodiments, the monitoring file may be generated successively. In some embodiments, the monitoring file may be generated through writing image data acquired from a current camera into a blank file. In 806, process 800 may determine whether the object enters into a neighboring camera. The phase "enters into" used herein may be used for brevity, which actually means the object enters into the FOV of a camera. In some embodiments, if level module 430 determines the object enters into a neighboring camera, process 800 may proceed to 803. In some embodiments, if level module 430 determines the object does not enter into a neighboring camera, the process may proceed to 807, where process 800 may determine whether to stop acquiring image data. In some embodiments, the determination may be performed based on a user operation or the status of the object. For example, if level module 430 determines the status of the object is out of the monitored scope of multi-camera system 100, process 800 may stop acquiring image data. In some embodiments, if level module 430 determines do not stop acquiring image data, process 800 may proceed to 804 and continue to acquire image data from a current camera. In some embodiments, if monitor module 460 determines stop acquiring image data, process 800 may proceed to 808 and output and/or store the monitoring file.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module" or "system." Furthermore, aspects of the present disclosure may take the form of a computer program product embodied in one or more computer readable media having computer readable program code embodied thereon.

A computer readable medium may include a propagated data with computer readable program code embodied therein, for example, in baseband or as part of a carrier wave. Such a propagated may take any of a variety of forms, including electro-magnetic, optical, or the like, or any suitable combination thereof. A computer readable medium may be any computer readable medium that is not a computer readable storage medium and that may communicate, propagate, or transport a program for use by or in connection with an instruction execution system, apparatus, or device. Program code embodied on a computer readable medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method comprising:
    identifying an object in a monitored scope of a multi-camera system, the multicamera system including a plurality of cameras;
    determining a plurality of features of the object, wherein the features of the object include at least one of a color, a texture, an edge feature, a shape feature, a movement tendency of the object, or a spatial relationship between the object and at least one camera;
    obtaining a plurality of reference object features;
    determining a position of the object in the FOV of the at least one camera based on matching between the features of the object and the reference object features;
    in response to a determination that the object is in a marginal region in the FOV of the at least one camera, wherein the marginal region in the FOV of the at least one camera includes a region close to a FOV of another camera, determining a first set of cameras from the plurality of cameras, wherein the first set of cameras are neighboring to the at least one camera based on physical location information or that the object is likely to enter FOVs of the first set of cameras;
    determining a second set of cameras from the plurality of cameras, wherein the second set of cameras are different from the first set of cameras and the at least one camera;
    assigning the at least one camera to a first mode; and
    assigning a second mode to the first set of cameras and a third mode to the second set of cameras, wherein:
        the first mode relates to a first bit rate, a first I frame interval, and a first coding algorithm,
        the second mode relates to a second bit rate, a second I frame interval, and a second coding algorithm,
        the third mode relates to a third bit rate, a third I frame interval, and a third coding algorithm,
        the first bit rate is greater than the second bit rate, and the second bit rate is greater than the third bit rate,
        the second I frame interval is greater than the first I frame interval, and the third I frame interval is greater than the second I frame interval,
        the first coding algorithm relates to Region of Interest coding, and the third coding algorithm relates to Variable Bit Rate coding, and
        under the first coding algorithm a raw image corresponding to an object activity region is coded, and the object activity region is a region in which the object engages an activity.

2. The method of claim 1, further comprising:
    assigning a first level to the at least one camera;
    assigning a second level to the first set of cameras; and
    assigning a third level to the second set of cameras.

3. A system comprising:
    an object module configured to identify an object in in a monitored scope of a multi-camera system, the multi-camera system including a plurality of cameras;
    a level module configured to:
        determine a plurality of features of the object, wherein the features of the object include at least one of a color, a texture, an edge feature, a shape feature, a movement tendency of the object, or a spatial relationship between the object and at least one camera;
        obtain a plurality of reference object features;
        determine a position of the object in a field of view (FOV) of the at least one camera based on matching between the features of the object and the reference object features,
        and in response to a determination that the object is in a marginal region in the FOV of the at least one camera, wherein the marginal region in the FOV of the at least one camera includes a region close to a FOV of another camera, determine a first set of cameras from the plurality of cameras and a second set of cameras from the plurality of cameras, wherein the first set of cameras are neighboring to the at least one camera based on physical location information or that the object is likely to enter FOVs of the first set of cameras, and wherein the second set of cameras are different from the first set of cameras and the at least one camera; and
    a mode module configured to:
        assigning the at least one camera to a first mode;
        assign a second mode to the first set of cameras and a third mode to the second set of cameras, wherein:
            the first mode relates to a first bit rate, a first I frame interval, and a first coding algorithm,
            the second mode relates to a second bit rate, a second I frame interval, and a second coding algorithm,
            the third mode relates to a third bit rate, a third I frame interval, and a third coding algorithm,
            the first bit rate is greater than the second bit rate, and the second bit rate is greater than the third bit rate,
            the second I frame interval is greater than the first I frame interval, and the third I frame interval is greater than the second I frame interval,
            the first coding algorithm relates to Region of Interest coding, and the third coding algorithm relates to Variable Bit Rate coding, and
            under the first coding algorithm a raw image corresponding to an object activity region is coded, and the object activity region is a region in which the object engages an activity.

4. The system of claim 3, wherein the level module is further configured to:
    assign a first level to the at least one camera;

assign a second level to the first set of cameras; and
assign a third level to the second set of cameras.

5. The system of claim 3, wherein the first bit rate is 4 Mbps, the first I frame interval is 50, and the first frame rate is 25 FPS.

* * * * *